United States Patent Office 3,291,859
Patented Dec. 13, 1966

3,291,859
BLOCK COPOLYMERS FORMED BY THE REACTION OF AN ISOCYANATE-TERMINATED POLYMER WITH A DUAL FUNCTIONAL FREE RADICAL INITIATOR AND AN ETHYLENICALLY UNSATURATED MONOMER
Arthur V. Tobolsky, 191 Snowden Lane, Princeton, N.J.
No Drawing. Filed Aug. 12, 1963, Ser. No. 301,607
23 Claims. (Cl. 260—859)

This invention is concerned with a novel process for the preparation of block polymers.

It is the object of this invention to provide a process for the preparation of block polymers.

This invention contemplates the preparation of block polymers characterized by having blocks of a polyvinyl polymer, joined to blocks of a polymeric moiety in which all carbon-to-carbon bonds are saturated. The block polymers are formed by reacting (1) a dual-functional free-radical initiator containing at least one functional group which decomposes into free radicals, and at least one substituent on the free-radical initiator molecule which has active hydrogen atoms capable of reacting with isocyanate; with (2) a polymeric moiety having isocyanate groups; and also reacting therewith (3) at least one ethylenically unsaturated monomer which polymerizes by a free radical mechanism. The preparation of the block polymers may be carried out in a one-step process in which the three noted components are reacted simultaneously. The block polymers may also be prepared in a two-step process in which the dual functional initiator preferably is reacted with the polymeric moiety having isocyanate groups to form a moiety having the free-radical initiators bonded thereto through reaction of the active hydrogen atoms on the initiators with the isocyanate groups of the polymeric moiety; and then reacting therewith an ethylenically unsaturated monomer. Alternately, it is possible to first polymerize the ethylenically unsaturated monomer with the dual-functional free radical initiator, thereby forming a polyvinyl polymer having terminal groups containing active hydrogen atoms and then reacting therewith the isocyanate-containing polymeric moieties to form the block polymers.

The polyvinyl polymer blocks of the block polymers are formed by free radical polymerization of at least one ethylenically unsaturated monomer. These are the polymerizable diene and vinyl monomers. They are illlustrated by the vinyl monomers, such as vinyl chloride, vinyl acetate, vinyl ethers, styrene, methyl-vinyl ketone, vinylidene chloride, etc.; the acrylic esters, such as methyl and ethyl acrylates, chloroacrylic esters, methacrylic esters such as divinyl methacrylic esters, acrylonitrile, methacrylic methacrylonitrile, and dienes such as butadiene, isoprene, and chloroprene. The terms "polyvinyl" and "polyvinyl polymers" are used herein to refer to polymers (and polymer blocks) formed by the polymerization of these ethylenically unsaturated monomers. The polyvinyl portion of the novel polymers may be of a homopolymeric nature or copolymeric where it is copolymerized from two or more ethylenically unsaturated monomers.

The dual functional initiators used in this process are those that (1) cause free-radical polymerization of the monomer to form the polyvinyl polymers, and (2) contain at least one functional group that will react with the isocyanate group. The second type of functional group contains an active hydrogen atom that is displaced during the reaction with the isocyanate. These active hydrogen atoms are characterized by a positive Zerewitinoff test. The most common functional groups containing these active hydrogen atoms are —OH,

—SH, —NH$_2$, and —NHR. The most common free-radical initiators, which may contain one, two, or more of the aforenoted functional groups, are the peroxides, the azo (including diazo) compounds, and the polysulfides.

The following are illustrative of the contemplated dual functional free-radical initiators:

methyl hydroxymethyl peroxide
ethyl hydroxymethyl peroxide
1-tetrallyl hydroxymethyl peroxide
t-butyl hydroxymethyl peroxide
methyl 1-hydroxymethyl peroxide
ethyl 1-hydroxymethyl peroxide
t-butyl-α-hydroxy-β,β,β-trichloroethyl peroxide
bis(hydroxymethyl) peroxide
bis(1-hydroxymethyl) peroxide
bis(α-hydroxymethyl) peroxide
bis(α-hydroxy-β,β,β-trichloroethyl) peroxide
bis(1-hydroxycyclohexyl) peroxide
methylethylketone peroxide isomer having the formula:

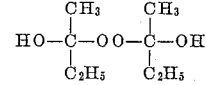

succinic acid peroxide

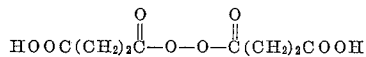

glutaric acid peroxide

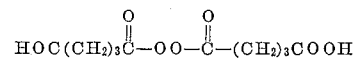

hydroxy benzoyl peroxide

Other substituted benzoyl peroxides having at least one functional group attached to the benzene ring that will react with isocyanate.

Other substituted diacylperoxides such as

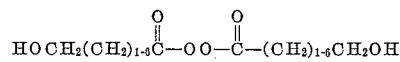

Illustrative polysulfides which may act as dual functional initiators include:

HOCH$_2$—CH$_2$—SSSS—CH$_2$—CH$_2$OH

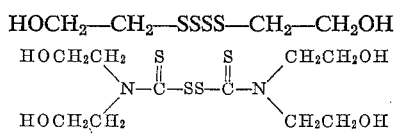

Illustrative azo compounds which will act as dual functional initiators include compounds having the formula

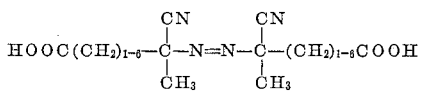

The presently most easily available dual functional initiators contain OH or COOH as the group reactive with isocyanate. However, using the basic idea outlined here for a dual functional initiator, many compounds can be synthesized where the functional group reactive with isocyanate is SH, NH$_2$, or NHR. It should be noted that when COOH reacts with isocyanate, CO$_2$ is generally split off.

The bis compounds are generally preferred as dual functional initiators. The following compounds are most readily available: the aforespecified isomer of methylethylketone, and succinic acid peroxide.

The polymeric moieties which form one of the blocks of the block polymers are polymeric materials which do not contain carbon-to-carbon unsaturation. They must each contain one or more isocyanate groups. The polymeric moiety is formed by reacting a base polymeric or high molecular weight material containing at least one active hydrogen, e.g. polyols, polyamines, hydroxyl terminated polyethers, polyesters, and the like, with a polyisocyanate-containing material so that the resultant polymer contains isocyanate groups. The commercially available isocyanate terminated polyesters and polyethers known in the chemical industry as prepolymers, having molecular weights, as obtained by present conventional methods, between about 700 and 10,000 are preferred for many of the contemplated polymers. Those polymeric or high molecular weight moieties having a weight of at least about 700 are generally preferred. With polymeric materials of at least this molecular weight, the residue incorporated in the resultant block polymer is sufficiently large to significantly affect the properties of the block polymer. For most purposes, it is not contemplated that the molecular weight of the polymeric moiety will be in excess of 15,000. The term "polymeric moiety" includes equally high molecular weight materials which may not, strictly speaking, be classified as polymers.

Polymeric moieties prepared from materials containing only one isocyanate group in the polymer chain may be used to prepare block polymers. It is contemplated that most of the block polymers will be prepared from polymeric moieties containing two or more isocyanate groups. These isocyanate groups are often in terminal positions and may be prepared by conventional means. A relatively simple preparatory process involves reacting diisocyanates, such as 2,4-toluene diisocyanate, 4-m-phenylene diisocyanate, hexamethylene diisocyanate and penthamethylene diisocyanate, with polymeric materials having functional groups with active hydrogen atoms (positive Zerewitinoff test). At least one molecule of diisocyanate for each active hydrogen should be used. Other useful isocyanates for this purpose include the diphenylmethane diisocyanates; dianisidine diisocyanate, such as 3,3-dimethoxy-4,4'-biphenylene diisocyanate; bitolyene diisocyanate, such as 3,3'-dimethyl-4,4'-biphenyl diisocyanate; diphenyldiisocyanate, such as xanylene 3,3'-diphenyl-4,4'-biphenylene diisocyanate; dichloroxenylene diisocyanate, such as 3,3'-dichloro-4,4-biphenylene diisocyanate; and triisocyanates such as 2,4,4'-triisocyanate-diphenyl ether. Polymeric isocyanate containing materials prepared from diisocyanates, as exemplified by 2,4-toluene diisocyanate have the following representation

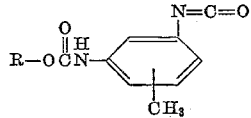

or more simply

R being a generalized representation of the polymer moiety.

The formation of the block polymers is caused by the unique action of the dual functional free-radical initiators. Consider for simplicity the case when the molecule has only one functional group capable of cleavage into free radicals (with or without the simultaneous release of a small molecule such as $CO_2$ or $N_2$). The initiator splits into two segments, each a free-radical and capable of initiating the free-radical polymerization of the monomer. For illustrative purposes, bis(hydroxyethyl) peroxide is typical. When split, two identical segments $HOC_2H_5O$ are formed, each containing a hydroxyl functional group which is capable of reacting with an isocyanate group of the polymeric moiety (represented by R—N=C=O).

The resultant block polymer contains the polymeric moiety linked through the reaction product of the isocyanate and the residue of the initiator to the polyvinyl polymer block,

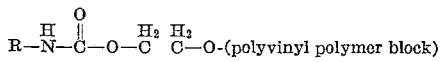

When the polymeric moiety has two terminal isocyanate groups, the resultant block polymers are linear and especially useful for the manufacture of fibers. Three dimensional block polymers are prepared when (1) the polymeric moieties contain more than two isocyanate groups or (2) when one or both segments of the dual functional free-radical initiator contains more than one functional group capable of reacting with isocyanate groups or (3) when the dual functional free radical initiator contains several functional groups which can split into free radicals as well as one or more suitably placed functional groups which can react with isocyanate.

In the preceding paragraph, the illustrative dual functional initiator contains two of the functional groups capable of reacting with the isocyanate, one upon each of the two segments into which the initiator divides to effect the polymerization. When each of the initiator segments contains at least one active hydrogen containing functional group, the resultant polymeric product is largely and often exclusively the desired block polymer. When utilizing a dual functional initiator such as methyl(hydroxymethyl) peroxide, the initiator splits into two initiator segments, only one of which contains the functional group containing the active hydrogen. The other initiator section is not dual functional and results in the homopolymerization of part of the monomer reactant. Utilizing such an initiator, the resultant product may contain about 75% of the desired block polymer, and about 25% of homopolymer.

When preparing the block polymers, the ratio of the ethylenically unsaturated monomer to the polymeric moiety reactant can vary widely. To obtain block polymers having properties which are attributed to the polyvinyl chains and also to the polymeric moiety, the ratio of the ethylenically unsaturated monomer to the polymeric moiety should be between 20:1 and 1:20, and preferably between 4:1 and 1:4.

The polymeric moieties should not contain unsaturated carbon-to-carbon bonds, such as those found in (1) polyesters formed from $\alpha,\beta$-dicarboxylic acids, e.g. maleic acid, or in (2) $\beta,\alpha$-unsaturated polyethers, to prevent interpolymerization (cross-linking) occurring between the ethylenically unsaturated sites. Interpolymerization of this nature would prevent the formation of true three-dimensional block polymers where the three-dimensional network is formed by the "blocks" of the original isocyanate containing polymer. However, the polymer or high molecular weight moieties may contain some unsaturated carbon-to-carbon bonds where the unsaturated sites are unreactive to interpolymerization with the ethylenically unsaturated monomer herein. The prepolymer formed by reacting castor oil with a diisocyanate is a high molecular weight moiety that has the inert characteristics of the operative polymeric moieties herein, i.e. will not interpolymerize with vinyl monomers, although some unsaturated carbon-to-carbon bonds are present. Such polymeric or high molecular weight moieties are contemplated as being equivalent of the polymeric moieties defined herein. As noted hereinbefore, the preparation of the block polymers may be carried out in a one-step process or in a two-step process. The conditions of the polymerization are dependent upon the materials utilized and the product desired. They may be controlled to yield relatively short chain polyvinyls. They may be controlled to prepare high molecular weight polyvinyl blocks. There need be no exact equivalence between isocyanate functionality of the "prepolymer" and the isocyanate reactive functionality of the initiator. There need be no complete reaction of all the available functions to form a perfect block polymer. Even with only partial reaction to form block polymer, this block polymer promotes the compatibility or mutual wettability of whatever homopolymers may be present sufficiently to give superior properties to those formed by gross mixtures of homopolymers. In the one-step process and also in the polymerization step of the two-step process, the reaction may be modified and/or controlled by using auxiliary catalysts, initiators, accelerators, cross-linking agents, such as tetraethylene glycol dimethacrylate or trimethylol propane, auxiliary curing agents reactive with isocyanates such as diols, diamines, polyols and polyamines, as well as terminators such as monofunctional alcohols or monofunctional (secondary) amines, etc. The polymerization conditions are similar to those known for the free radical polymerization of ethylenically unsaturated monomers to form polyvinyl polymers. A variant of this invention involves incorporating in the reaction mixture a free-radical polymerization initiator and a polymer chain transfer agent of the following type:

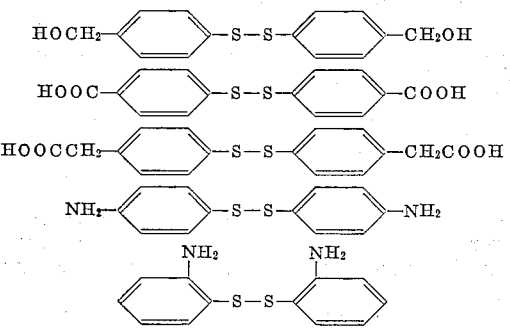

The mechanism by which these transfer agents work in the preparation of block polymers is as follows: the free-radical initiator (any initiator such as benzoyl peroxide) starts a growing polymer free radical. This growing radical attacks the disulfide bond and cleaves it: thus we have a polyvinyl chain terminated, for instance, by:

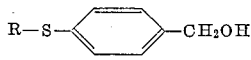

The fragment starts a new polyvinyl chain as follows:

The hydroxyl groups at the ends are capable of reacting with the polymeric moiety. The order of reaction does not matter. Conventional free radical initiators may be used. The dual functional free radical initiators of the type defined hereinbefore are preferred. The length of the polyvinyl blocks are controlled by the relative amount of the chain transfer agent.

The invention is further illustrated by the following examples:

*Example I*

2.4 g. of polyether prepolymer (prepared by reacting a hydroxy terminated polypropylene oxide (two hydroxyl groups per polymer chain, molecular weight about 1800) with sufficient 2,4-toluene diisocyanate to form an isocyanate terminated prepolymer) is dissolved in 7.6 g. of styrene, in a dry small glass jar with a gas tight lid. 0.2 g. of dry methylethylketone peroxide isomer as the dual functional free-radical initiator and optionally (but preferably) 0.05 g. of dry pyridine is added to the mixture. Air was flushed out of the jar by use of small chunks of Dry Ice. The lid was sealed and the mixture was kept in the closed container at room temperature for 12 hours, then heated in an oven at 70° C.–75° C. for 24 hours, finally heated in the same oven at 100° C. for 72 hours. All of the contents of the jar were substantially converted to polymer.

*Example II*

Following the procedure of Example I, a polymer is formed using a polyester prepolymer, prepared by reacting a hydroxy terminated polyester of adipic acid, ethylene glycol and propylene glycol (two hydroxyl groups per polymeric chain, molecular weight about 2,000) with sufficient 2,4-toluene diisocyanate to form an isocyanate terminated prepolymer, instead of the polypropylene oxide prepolymer.

*Example III*

Following the procedure of Example I, using methylmethacrylate instead of styrene, a polymer is formed in the jar.

*Example IV*

Following the procedure of Example II, using methylmethacrylate instead of styrene, a polymer was formed in the jar.

*Example V*

Following the procedure of Example I, using succinic acid peroxide as the initiator instead of methylethyl ketone peroxide isomer, a polymer was formed in the jar.

*Example VI*

Following the procedure of Example V, using methylmethacrylate instead of styrene, a polymer was formed.

*Example VII*

Following the procedure of Example I, using ethyl acrylate in place of styrene, a polymer was formed.

Because the block polymer can be formed in a one-step or two-step process, the order of addition of the ingredients is not critical, although it may provide a means of obtaining minor variations in the structure of the block polymers.

Countless other combinations of reactants and dual functional initiators may be used to prepare block polymers in accordance with my invention. The essential procedure outlined in Examples I–VII can be widely used. For example the following are viable combinations:

(a) Tetramethylene oxide prepolymer, acrylonitrile, and methylethylketone peroxide isomer,
(b) Polypropylene oxide prepolymer, isoprene, and methylethylketone peroxide isomer,
(c) Polyester prepolymer, styrene, and $$HOOC(CH_2)_2-\underset{CH_3}{\overset{CN}{C}}-N=N-\underset{CH_3}{\overset{CN}{C}}-(CH_2)_2COOH$$

(d) Polyester prepolymer, styrene, and bis(2-hydroxyethyl) tetrasulfide,
(e) Polyester prepolymer, styrene, and bis(2-mercaptoethyl) tetrasulfide,
(f) Polyester prepolymer, methyl methacrylate, and glutaric acid peroxide,
(g) Polyester prepolymer, methyl methacrylate, ethyleneglycol dimethacrylate, and methylethylketone peroxide isomer,
(h) Polyester prepolymer, styrene trimethylol propane, and methylethylketone peroxide isomer.

The block polymers of this invention have a variety of uses. Linear block polymers may be used for the manufacture of fibers or moldings. Three-dimensional block polymers may be used for many common articles of manufacture such as coatings and castings. The polymer may be prepared in the form of foam.

The block polymers of this invention have a unique combination of properties derived from the fact that they contain moieties of two different types of polymers (generally a polyvinyl moiety and a condensation polymer moiety). We therefore have polymers having two different glass transition temperatures and providing polymers of high modulus and high impact strength over a wide range of temperature. We may produce polymers having unique properties by combining a polymeric moiety which tends to crystallize with a polymeric moiety which remains amorphous. Unusual solubility properties of the block polymers can be obtained because each moiety may have widely different solubility.

Though the invention has been described with reference to only a limited number of examples it is to be understood that variants thereof may be produced without departing from its spirit or scope.

What is claimed is:
1. The process for preparing block polymers comprising reacting
    (1) a polymeric moiety, said moiety having only saturated carbon-to-carbon bonds in its structure and containing at least one isocyanate group in a position suitable for reaction;
    (2) at least one ethylenically unsaturated monomer; and
    (3) a dual functional free-radical initiator, said initiator containing
        (i) at least one group functioning as a free-radical initiator, and
        (ii) at least one other group containing an active hydrogen atom and capable of reacting with an isocyanate group by displacement of said active hydrogen atom, said initiator being selected from the group consisting of peroxide, azo, and polysulfide free-radical initiators containing at least one substituent selected from the group consisting of —OH, —COOH, —SH, —NH$_2$ and —NHR,
thereby to form a block polymer containing said polymeric moiety linked to polymer formed from said monomer through said isocyanate group.

2. The process for preparing block polymers comprising simultaneously reacting
    (1) a polymeric moiey, said moiety having only saturated carbon-to-carbon bonds in its structure and containing isocyanate groups in position suitable for reaction;
    (2) at least one ethylenically unsaturated monomer; and
    (3) a dual functional free-radical initiator selected from the group consisting of peroxide, azo, and polysulfide free-radical initiators containing at least one substituent selected from the group consisting of —OH, —COOH, —SH, —NH$_2$ and —NHR,
thereby to form a block polymer containing said polymeric moiety linked to polymer formed from said monomer through said isocyanate groups.

3. The process of claim 2 wherein the polymeric moieties are selected from polyethers and polyesters.

4. The process of claim 3 wherein the dual functional free-radical initiators are peroxides.

5. The process of claim 4 wherein the dual functional free-radical initiator contains hydroxyl functional groups.

6. The process of claim 5 wherein the dual functional free-radical initiator is a "methylethylketone peroxide" having the formula

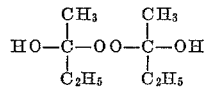

7. The process of claim 4 wherein the dual functional free-radical iniator is a "succinic acid peroxide" having the formula

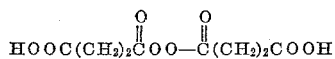

8. The process of claim 4 wherein the dual functional free-radical initiator is a "glutaric acid peroxide" having the formula

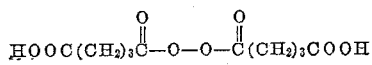

9. The process for preparing block polymers comprising reacting polymeric moieties having only saturated carbon-to-carbon bonds and containing isocyanate groups, with a dual functional free-radical initiator selected from the group consisting of peroxide, azo, and polysulfide free-radical initiators containing at least one substituent selected from the group consisting of —OH, —COOH, —SH, —NH$_2$ and —NHR; and then copolymerizing therewith at least one ethylenically unsaturated monomer, thereby to form a block polymer containing said polymeric moiety linked to polymer formed from said monomer through said isocyanate group.

10. The process for preparng block polymers comprising polymerizing at least one ethylenically unsaturated monomer in the presence of a dual functional free-radical initiator selected from the group consisting of peroxide, azo, and polysulfide free-radical initiators containing at least one substituent selected from the group consisting of —OH, —COOH, —SH, —NH$_2$ and —NHR to form polyvinyl polymers having active hydrogen atoms; and then reacting therewith polymeric moieties having only saturated carbon-to-carbon bonds and containing isocyanate groups in position suitable for reaction to unite said polymeric moieties with said polyvinyl polymer through said isocyanate groups.

11. A block polymer comprising
    (i) at least a block of one polymerized ethylenically unsaturated monomer; joined to
    (ii) at least a block of a polymeric moiety having only saturated carbon-to-carbon bonds,
through a linkage formed by an isocyanate group with the residue of a dual functional free-radical polymerization initiator; said dual functional initiator being selected from the group consisting of those having
    (i) at least one group functioning as a free-radical initiator, and
    (ii) another group containing an active hydrogen atom and capable of reacting with an isocyanate group by displacement of said active hydrogen atom, said initiator being selected from the group consisting of peroxide, azo, and polysulfide free-radical initiators containing at least one substituent selected from the group consisting of —OH, —COOH, —SH, —NH$_2$ and —NHR,
thereby to form a block polymer containing said polymeric moiety linked to polymer formed from said monomer through said isocyanate group.

12. A block polymer comprising
    (i) a block of polyvinyl polymer joined to
    (ii) blocks of polymeric moiety having a molecular weight in excess of 700 and having only saturated carbon-to-carbon bonds, selected from the group consisting of polyethers and polyesters,
through a linkage of an isocyanate group with the residue of a dual functional free-radical polymerization initiator selected from the group consisting of peroxide, azo, and polysulfide free-radical initiators containing at least one substituent selected from the group consisting of —OH, —COOH, —SH, —NH$_2$ and —NHR; the weight ratio of the polyvinyl polymer blocks to the polymeric moiety blocks being between 1:4 and 4:1.

13. The block polymers of claim 12 wherein the polymeric moieties are formed from polyethers.

14. The block polymers of claim 13 wherein the polyether prepolymers are selected from the group consisting of polypropylene oxide, polyethylene oxide and polytetramethylene oxide.

15. The block polymers of claim 12 wherein the polymeric moieties are formed from polyesters.

16. The block polymers of claim 15 wherein the polyester is a hydroxy terminated polyester of adipic acid, ethylene glycol and propylene glycol.

17. The block polymers of claim 12 wherein said monomer is selected from the group consisting of styrene, methyl methacrylate, acrylonitrile, butylacrylate and isoprene.

18. The block polymers of claim 17 wherein said monomer is styrene.

19. A linear block polymer comprising
(i) a block of polyvinyl polymer, joined to
(ii) a block of polymeric moiety having a molecular weight in excess of 700 and having only saturated carbon-to-carbon bonds,
through the linkage an isocyanate group with the residue of a dual functional free-radical polymerization initiator selected from the group consisting of peroxide, azo, and polysulfide free-radical initiators containing at least one substituent selected from the group consisting of —OH, —COOH, —NH$_2$ and —NHR; the weight ratio of the polyvinyl polymer blocks to the polymeric blocks being between 1:4 and 4:1.

20. The process of claim 2 wherein the reaction mixture also contains a polyfunctional agent selected from the group consisting of ethyleneglycol dimethacrylate and trimethylol propane, which functions to cross-link the block polymers.

21. The process for preparing block polymers comprising reacting
(1) a polymeric moiety having only saturated carbon-to-carbon bonds and containing isocyanate groups;
(2) at least one ethylenically unsaturated monomer;
(3) a free radical polymerization initiator; and
(4) a polymer chain transfer agent corresponding to the formula

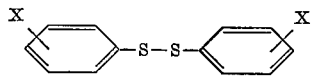

wherein X is selected from the group conisting of —OH, —COOH, —SH, —NH$_2$ and —NHR, and $n$ is a small integer having a value of 1–12,
thereby to form a block polymer containing said polymeric moiety linked to polymer formed from said monomer through said isocyanate group.

22. The process of claim 21 wherein said initiator is a dual functional free-radical initiator, containing
(i) at least one group functioning as a free-radical initiator, and
(ii) at least one other group containing an active hydrogen atom and capable of reacting with an isocyanate group by displacement of said active hydrogen atom, said initiator being selected from the group consisting of peroxide, azo, and polysulfide free-radical initiators containing at least one substituent selected from the group consisting of —OH, —COOH, —SH, —NH$_2$ and —NHR,
thereby to form a block polymer containing said polymeric moiety linked to polymer formed from said monomer through said isocyanate group.

23. The process of preparing block polymers comprising reacting
(1) a polymeric moiety having only saturated carbon-to-carbon bonds and containing isocyanate groups;
(2) at least one ethylenically unsaturated monomer;
(3) polymer chain transfer agents selected from the group consisting of

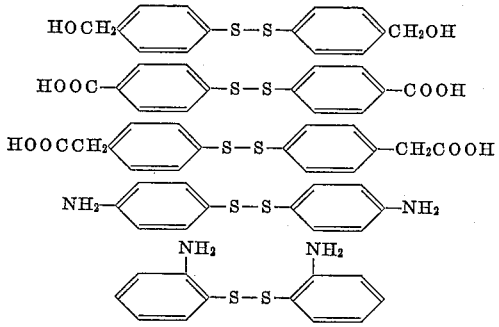

and
(4) a dual functional free-radical initiator selected from the group consisting of peroxide, azo, and polysulfide free-radical initiators containing at least one substituent selected from the group consisting of —OH, —COOH, —SH, —NH$_2$ and —NHR,
thereby to form a block polymer containing said polymeric moiety linked to polymer formed from said monomer through said isocyanate group.

No references cited.

MURRAY TILLMAN, Primary Examiner.

P. LIEBERMAN, Assistant Examiner.